Figures 1, 2:
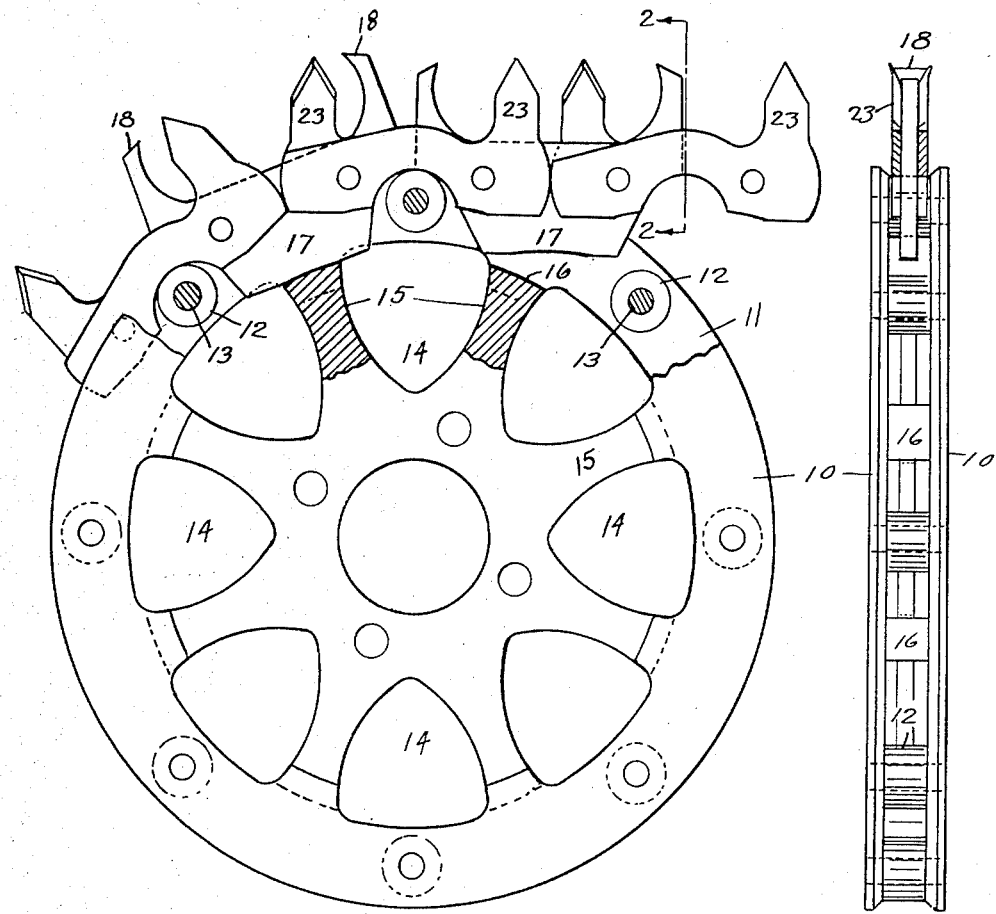

Feb. 17, 1925.  
C. WOLF  
LINK SAW  
Filed April 27, 1921

1,526,451

INVENTOR  
CHARLES WOLF.  
By E.B. Birkenbeuel  
HIS ATTORNEY.

Patented Feb. 17, 1925.

1,526,451

UNITED STATES PATENT OFFICE.

CHARLES WOLF, OF PORTLAND, OREGON.

LINK SAW.

Application filed April 27, 1921. Serial No. 464,876.

*To all whom it may concern:*

Be it hereby known that I, CHARLES WOLF, a citizen of the United States, and resident of Portland, in the county of Multnomah and State of Oregon, have invented a certain new and useful Improvement in Link Saws, such as are more fully set forth in my Patent No. 1,397,026, Nov. 15, 1921.

This invention relates more particularly to an improved form of chain saw and sprocket.

The objects of my invention are to provide a driving sprocket for chain saws which will not accumulate saw dust, and to reduce the angle of pull between the links.

I accomplish these results in the manner set forth in the following specification and illustrated in the accompanying drawing in which:

Figure 1 is a side elevation of a sprocket with a portion of the chain passing around same. Figure 2 is a front elevation of Fig. 1, and also a partial section along the line 2—2 in Fig. 1.

Similar numbers of reference refer to the same or similar parts throughout the several views.

Referring in detail to the drawing, it will be observed that I have constructed a grooved sprocket member 10 having mounted in its groove 11 a plurality of rollers 12 carried by the pins 13. Openings 14 starting near the center of the sprocket open into the groove 11 leaving only the spokes 15 to support the sprocket portion of the wheel. The face 16 at the end of each spoke has a function which will be explained later.

It will be seen that between the rollers 12 are the drag links 17 having a drag tooth 18 at each end, and pin holes below and between the points of the drag teeth 18.

This series of drag links is united together by means of pairs of cutting links 22. Each link of each pair of cutting links has a cutting tooth 23 formed on one end opposite to that of the tooth carried by its mate. It must be carefully observed that these cutting links always engage the wood at points between the two teeth of a drag link.

It will readily be seen by inspection of Fig. 1, which illustrates the manner in which the rollers support the chain, that by the use of this type of sprocket a chain is quite incapable of canting and thereby inflicting the extreme wear upon the sprocket and the groove of the saw frame around which the chain passes.

The cutting links 22 ride upon the rollers 12, whereas the drag links 17 ride upon the curved faces 16 of the spokes 15. It follows that the angular pull between the links is much less than would be the case where the pitch of the chain was equal to the circular distance between the rollers.

It will be understod that when a solid sprocket is used that saw dust accumulates between the sprocket and chain and soon renders the device inoperative. By my construction the sprocket becomes a fan which blows the saw dust away from the working parts.

While I have thus illustrated and described my invention it is not my desire to limit myself to this precise form or method of application, but intend that it shall cover all forms and modifications that fall fairly within the appended claims.

What I claim is:

1. The combination of a sprocket wheel consisting of a central hub having radiating spokes and having the periphery of the wheel grooved to form opposing side plates extending to the openings between the spokes, and having one chain-carrying roller mounted between said plates outside of and between each pair of said spokes; with a block chain having projecting block links which ride upon the ends of said spokes, and whose side links ride upon said rollers outside of the line of pull of said chain in a manner to reduce the angular pull between the links of said chain and to reduce the canting effect.

2. The combination of a sprocket wheel consisting of a central hub having radiating spokes and having the periphery of the wheel grooved to form opposing side plates extending to the openings between the spokes and having one chain-carrying roller mounted between said side plates midway between said spokes; with a block chain having drag teeth formed at each end of each block link outside of their connecting pins, each of said block links having a projecting base which can rest upon the end of a spoke; and pairs of side links bearing cutting teeth and connecting said block links, said side links having recessed edges which ride upon said rollers outside of the line joining the pins in said side links.

CHARLES WOLF.